United States Patent [19]

Boudreau et al.

[11] Patent Number: 5,024,504

[45] Date of Patent: Jun. 18, 1991

[54] METHOD OF ALIGNING AND PACKAGING AN OPTOELECTRONIC COMPONENT WITH A SINGLE-MODE OPTICAL FIBER ARRAY

[75] Inventors: Robert A. Boudreau, Hampton, N.H.; William C. Rideout, Townsend, Mass.

[73] Assignee: GTE Laboratories Incorporated, Waltham, Mass.

[21] Appl. No.: 439,761

[22] Filed: Nov. 20, 1989

[51] Int. Cl.$^5$ .............................................. G02B 6/32
[52] U.S. Cl. ............................... 350/96.18; 350/96.20
[58] Field of Search ............... 350/96.10, 96.15, 96.18, 350/96.20, 96.21, 320

[56] References Cited

U.S. PATENT DOCUMENTS

| | | | |
|---|---|---|---|
| 4,575,194 | 3/1986 | Streifer et al. | 350/413 |
| 4,616,899 | 10/1986 | Schlafer | 350/96.18 |
| 4,732,448 | 3/1988 | Goldenberg | 350/96.18 |
| 4,752,109 | 6/1988 | Gordon et al. | 350/96.18 |
| 4,767,172 | 8/1988 | Nichols et al. | 350/96.18 |
| 4,878,724 | 11/1989 | Thaniyavarn | 350/96.14 |

OTHER PUBLICATIONS

"Optical Fiber Coupling Approaches for Multi-Channel Laser and Detector Arrays", by Jackson et al., Proc. SPIE 994, 40 (1988).
"Improved LED and Laser Packaging Using Up-Tapered Single Mode Fibers", Poster Presentation T4514 at Lasers and Electrooptics (CLEO) '89 in Baltimore, MD., Apr. 25, 1989.
"A Packaging Technique to Achieve Stable Single Mode Fiber Laser Alignment", by S. Enochs, Proc. SPIE 703, 42 (1987).
"An Automated Fiber Alignment, Fixing, and Hermatic Sealing System", by D. S. Bargar, Proc. SPIE, 994, 11 (1988).

Primary Examiner—Akm Ullah
Attorney, Agent, or Firm—Victor F. Lohmann, III; James J. Cannon, Jr.

[57] ABSTRACT

A method for optically coupling multiple single-mode optical fibers to a single packaged optoelectronic array device uses a single graded index lens to magnify the images of the active semi-conductor elements and to expand the spacing between their light beams. These separated magnified light beams then coupled to an associated array of uptapered optical fibers. Simultaneous alignment is possible because the location of the semiconductor array beams can be known with high precision relative to the central beam in the array. A lens with known magnification is first positioned relative to the central beam. Alignment to this central beam automatically aligns other optical fibers held collectively in a fixture engineered with the geometry set by the known magnification of the lens. The coupling of single-mode optical fiber to two-dimensional semiconductor surface arrays utilizes the projected and magnified beams of the array which replicate the precise placement of the array elements. A mandrel supports the uptapered optical fibers. Simultaneous alignment of the optical fiber array is performed by first aligning the center fiber, and then rotating the mandrel until the outside fibers come into alignment.

39 Claims, 8 Drawing Sheets

METHOD OF ALIGNING AND PACKAGING AN OPTOELECTRONIC COMPONENT WITH A SINGLE-MODE OPTICAL FIBER ARRAY

BACKGROUND OF THE INVENTION

This invention relates to packaging of optoelectronic components which generate or process signals that pass through optical fibers. In particular, it addresses the critical need for providing stable low-cost alignment of multiple single mode optical fibers to a single packaged device, such as a semiconductor array of laser amplifiers, lasers or photodetectors. Such devices have closely spaced active regions to which the optical fibers must be coupled.

An optoelectronic package is a container or housing that provides protection and support for both active and passive components contained within it. These components and their interconnection represent an optical-electrical circuit and define the function of the package. The package also includes a means of connecting the internal components with the external environment, usually as electrical feed-through and optical fiber. Our invention is concerned with the optical fiber and how it is connected to the components within the package.

To make an optical connection between an optical fiber and an optoelectronic component within a package, it is necessary to position or align the optical fiber in a way that allows efficient coupling between the optical fiber and the optoelectronic component. The precision needed for the alignment depends on the size of the light-emitting or light-receiving elements, the type of optical fiber, and any type of focusing or defocusing elements which may be present. Optical fiber transmits light through its inner core, which is much smaller than the diameter of the optical fiber. There are two classes of optical fiber presently used in packaging semiconductor devices: single-mode and multi-mode, with typical core diameters of about 10 $\mu$m and 50 $\mu$m, respectively. Many telecommunication applications use single-mode optical fiber because of the superior bandwidth arising from its reduction of mode partition noise.

The prior art for multi-fiber array alignment to a single package is predominantly concerned with the easier task of coupling large core multi-mode optical fiber to relatively large light sources and detectors. These alignments are less sensitive to position and can often be done with grooved parts and epoxy to fasten the optical fiber. This technology is acceptable for short length optical fiber links in local area networks or computers, but not for telecommunications.

Connecting single-mode optical fiber to semiconductor devices is difficult. Extremely tight tolerances, on the order of 1 $\mu$m, are needed due to the small size (about 1 $\mu$m) of the active region and the small optical fiber core. Optical fibers are usually actively aligned to the semiconductor component. This means that for the semiconductor laser, the laser is electrically biased to emit light. The optical fiber is then aligned to a position that maximizes its reception of light, a condition monitored by coupling a detector to the opposite end of the optical fiber. The manipulation of the optical fiber is usually done with a suction-tipped micromanipulator arm with piezo-electric controls having submicron positional sensitivity. Additional problems arise when more than one optical fiber needs to be coupled to a single device, since this necessarily entails either simultaneous alignment or sequential alignment to multiple optical fibers. Simultaneous alignment is a situation in which each optical fiber must be physically connected to a manipulator of some kind, the optical fibers then moved together and held in position all at the same time. Sequential alignment is the process of aligning separate optical fibers, one by one. Alignment of one optical fiber often disrupts previously aligned optical fibers such that the overall yield of the process may be low. For array alignments, the active elements may be only 150 to 300 $\mu$m apart on the semiconductor, leaving little room for holding the optical fibers, which normally have physical outside diameters (core plus cladding) of 125 $\mu$m. The optical fibers would be nearly in contact with each other when positioned for direct coupling to the active regions on the semiconductor.

Once single-mode optical fibers are aligned, they are usually fixed in their position by laser welding or soldering. It has been shown that the application of a GRIN lens with an uptapered optical fiber will increase the alignment tolerances to the extent that the more easily made epoxy attachment can be made at room temperature and without the cost of the laser welding. This advantage is present in our current invention as applied to arrays.

SUMMARY OF THE INVENTION

The principal object of the present invention is to provide a method for quick and efficient optical coupling of multiple single-mode optical fibers to an array of closely spaced active semiconductor elements.

A second object of the present invention is to provide a method for establishing optical connections that permit independent transfer of telecommunications data and information for each semiconductor element.

Another object of this invention is to provide a method that is not limited to one-dimensional arrays, such as standard edge emitters and detectors, but can also be used for two-dimensional arrays, such as surface emitters and detectors.

Still a further object of the present invention is to provide a predictable, reproducible location of the optical fibers for maximum coupling efficiency, so that an entire array of optical fibers can be simultaneously aligned, taking maximum advantage of the extreme precision of the semiconductor array dimensions.

A further object of the invention is to provide a method which offers the opportunity to introduce optical filtering of the separate beams in an array, due to the increased space between the lens and the fibers.

SUMMARY

In a first aspect of the invention, a method for precise sequential alignment of multiple single-mode optical fibers to a packaged optoelectronic component having at least two light-emitting sources begins with the selection of a graded index lens having a numerical aperture sufficiently large to optically access the light-emitting sources of said optoelectronic component and securing said graded index lens on the substrate of said package a fixed distance from said optoelectronic component. Uptapered optical fibers are sequentially aligned with said light source by optically coupling one uptapered single-mode optical fiber to each light beam emanating from said optoelectronic component after said beam has been magnified by said lens and then securing said optical fibers to said package after alignment.

In a second aspect of the invention, a method for precise simultaneous alignment of multiple single-mode optical fibers to a single packaged optoelectronic array device having at least two light-emitting sources begins with the selection of a graded index lens having a numerical aperture sufficiently large to optically access the light-emitting sources of said optoelectronic array and securing said graded index lens on the substrate of said package a fixed distance from said optoelectronic array such that the light beams from said light-emitting sources are magnified and the spacing between said beams is expanded. Then a plurality of uptapered optical fibers, all held in a single holder having the fibers in predetermined locations, are aligned with said light sources by optically coupling the thick end of one centrally disposed uptapered single-mode optical fiber to its associated light beam emanating from said optoelectronic array, automatically and simultaneously aligning any other uptapered fibers after said beam has been magnified by said lens and securing said optical fibers to said package after alignment.

In a third aspect of the invention, a method for simultaneous, precise alignment of an array of multiple single-mode optical fibers to a single packaged optoelectronic array device having a two dimensional array, such as a surface array, of at least two light-emitting sources begins with the selection of a graded index lens having a numerical aperture sufficiently large to optically access the light-emitting source of said optoelectronic array and securing said graded index lens on the substrate of said package a fixed distance from said optoelectronic array such that the light beams from said light-emitting sources are magnified and the spacing between said beams is expanded. Then the array of uptapered optical fibers is positioned and secured in a fixture such that the spacing of the thick ends of said uptapered optical fibers matches the spacing of said light beams emanating from said array after magnification and separation by said lens. The array of uptapered optical fibers in said fixture is then actively aligned with said light sources by optically coupling the thick end of one uptapered single-mode optical fiber centrally positioned in said fixture to that light beam emanating from a central light source of said optoelectronic array after said beam has been magnified by said lens, followed by rotation of said fixture until a second uptapered single-mode fiber is aligned simultaneously, thereby aligning all of said fibers with said light sources and said fixture is secured to said package after alignment.

DESCRIPTION OF THE PREFERRED EMBODIMENTS

Figure 1A:
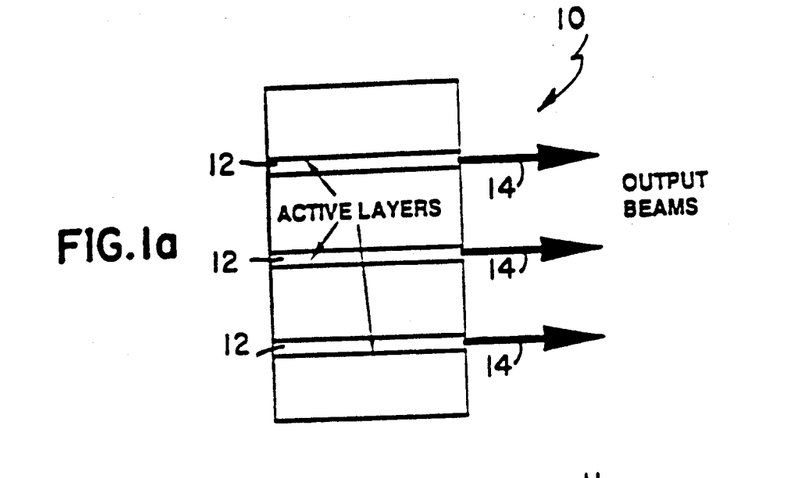
FIG. 1a is a schematic top view of an array of three semiconductor lasers.
Figure 1B:
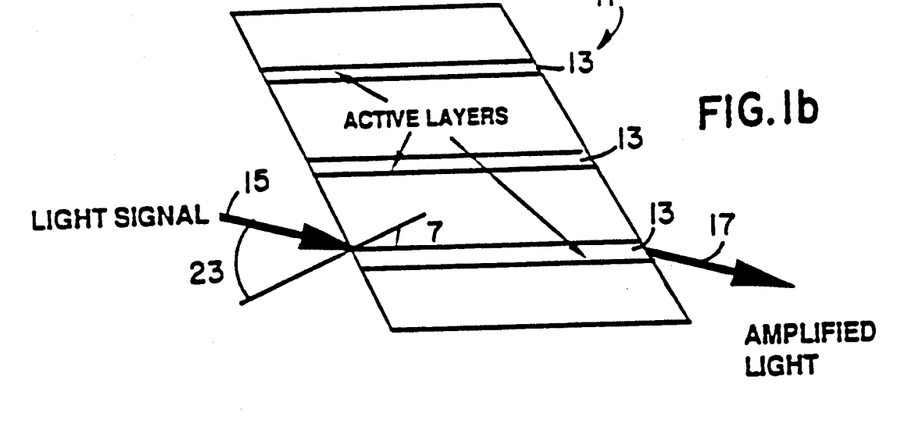
FIG. 1b is a schematic top view of an array of three semiconductor laser amplifiers.
Figure 1C:
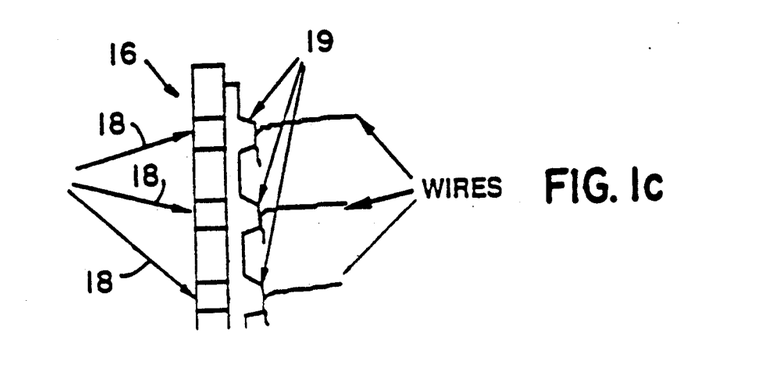
FIG. 1c is a schematic side view of an array of three semiconductor optical detectors.

This invention pertains to a method for quick and efficient optical coupling of multiple single-mode optical fibers to an array of closely spaced active semiconductor elements, and to optoelectronic packages incorporating the method. Examples of semiconductor devices which require multiple optical fibers set in an array are shown in FIGS. 1a, 1b and 1c. FIG. 1a shows an array 10 of semiconductor lasers 12, used as light sources for such purposes as parallel processing. An optical fiber must be coupled to each lasing output beam 14. FIG. 1b shows an array 11 of optical amplifiers 13, which receive light at one end and output the amplified light at the other end. One array of optical fibers 15 must couple the light signals into the optical amplifiers, and another array of optical fibers 17 must couple the amplified output. FIG. 1c shows an array 16 of detectors 19. One array 18 of optical fibers must couple the light signals into these detectors 19.

Figure 2:
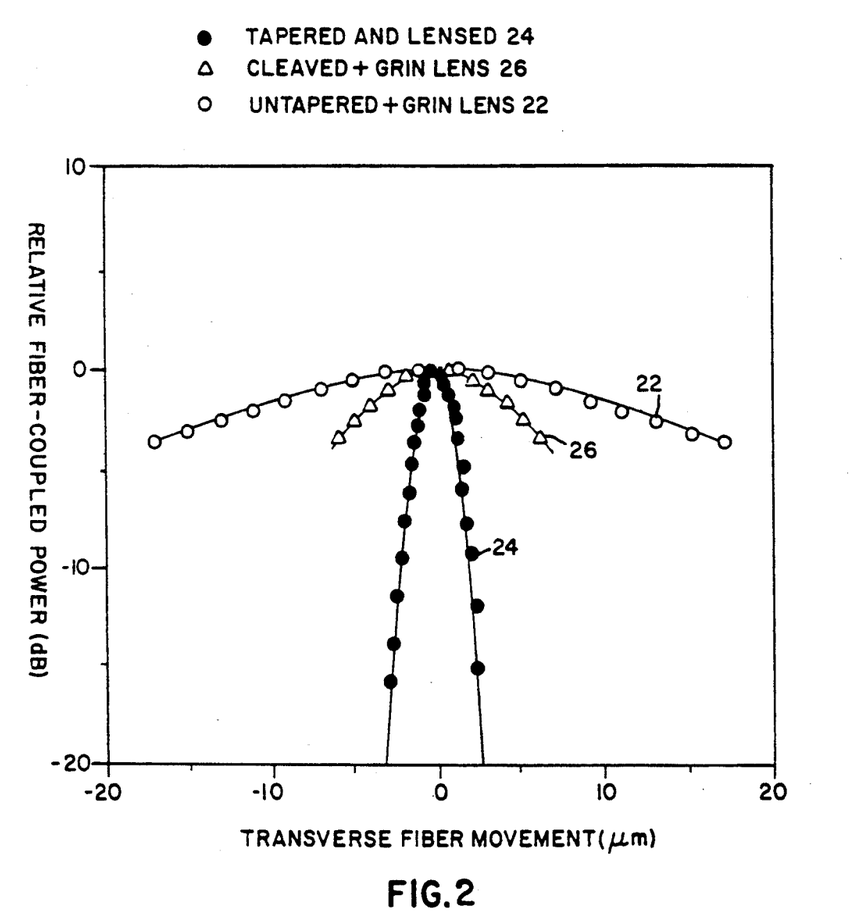
FIG. 2 is a graph showing the transverse sensitivities of various single-mode optical fiber couplings to a semiconductor laser.

FIG. 2 shows coupling performance, that is, the effect on relative fiber-coupled power and dB of transverse fiber movement, between a single-mode optical fiber and a high speed laser, a typical telecommunications component. For conventional tapered and lensed optical fibers, shown on line 24, the position sensitivity can be as little as 1 μm, a size much smaller than the parts themselves. Prior art shows alignment methods and packages based on these alignment methods for one single-mode optical fiber per package. FIG. 2 also shows the use of an uptapered optical fiber and a graded index (GRIN) lens, line 22. This uptapered fiber system has the advantage of relaxing the lateral positional tolerances of the optical fiber at the expense of tightening the angular tolerances. FIG. 2 also shows the third case where a GRIN lens is used with a standard cleaved optical fiber, line 26. This is an intermediate case of positional sensitivity, but is considered unfavorable because it is not suited to work with as much magnification as is the uptapered fiber. With all methods, problems are compounded when more than one single-mode optical fiber must be aligned to the same package in an array. By reducing the positional sensitivity, it is possible to achieve the necessary yield improvement required for doing array alignments.

The method of this invention uses a lens, with a sufficient numerical aperture and magnification, in conjunction with uptapered single-mode optical fiber. The technique takes advantage of the relaxed mechanical tolerance and increased fiber-to-fiber spacing arising from the magnification provided by the lens and the larger cored uptapered fiber optics. Such optical connections then permit independent transfer of telecommunications data and information for each semiconductor element.

Specifically, this invention provides a new method for optically coupling multiple single-mode optical fibers to a single packaged optoelectronic array device using a single lens with the array of semiconductor elements in order to magnify the images of the various active elements to expand the spacing between them as well as their size. These separate images are then coupled to an array of uptapered optical fibers. This magnification greatly facilitates mechanical alignment and coupling of the semiconductor elements to the associated array of optical fibers by relaxing mechanical tolerances associated with the positions of the rays of light coming from the multiple lasers. It also separates the positions of the rays sufficiently to allow space for mechanical fixturing to hold the separate optical fibers to receive the light.

Uptapered optical fibers are used because the effect of magnification not only increases the spacing between the separate rays of light but also increases the size of the separate beams or spots. These beams are best collected on the thick end of the uptapered fiber, where the size of the optical fiber best matches the size of the separate beams. For example, a typical uptapered optical fiber may have a core that is 10 times larger on its thick end than the single mode fiber it tapers down to. This optical fiber is used with a lens that magnifies everything ten fold, both the spot size of the beam as well as the spacing between beams. This effect facilitates the alignment when assembling an optoelectronic package, since the magnification typically results in a spacing of about 3 mm between separate light beams.

This description of the preferred embodiments also applies to the case of an array of detectors, in which case the light path is simply in the reverse direction, passing from the optical fiber to the semiconductor.

Simultaneous alignment is possible with this system because the location of the semiconductor array beams can be known with high precision relative to the central beam in the array. This is because the semiconductor elements are usually patterned on the semiconductor with photolithography to a high level of precision, about 1 μm, and the lens projects a precise image of this pattern towards the fibers. If a lens with known magnification is first positioned rigidly in a central specified location, then the location of the other projected beams are known. Alignment to this central beam automatically would align other optical fibers held collectively in a fixture engineered with the geometry set by the known magnification determined by the lens. Tolerance errors are also greatly reduced if only a single lens is used, eliminating errors incurred from alignment of multiple lenses to each other.

One limitation of the invention that must be considered is the issue of numerical aperture (N.A.) of the lens. This is analogous to field of view through a microscope or a pair of binoculars. The numerical aperture of the lens is defined as:

$$N.A. = n_o \sin a$$

where a = lens acceptance angle.
and $n_o$ = index of refraction of the lens.

This limits the number of semiconductor elements arranged in a line that can be accessed optically. A lens with the largest possible numerical aperture should be chosen. A good value for the numerical aperture is about 0.6, and all our experimentation was conducted with a lens having this numerical aperture. Using this lens we were able to easily couple to an in-line 5 element array.

One special feature of our invention is that the effect of the N. A. limitation can be eliminated or reduced when used in conjunction with a surface emitting array since the field of view is two-dimensional. Presently, no schemes exist for coupling single mode optical fiber to semiconductor surface arrays. However, this method is valuable in making it possible by relaxing positional tolerances. Since the system works well with a five element in-line array, it follows, that it works for a seventeen-element surface array having elements arranged within an numerical aperture limited circle on the semiconductor. The projected and magnified image of the surface array replicates the high precision of the placement of the array elements, facilitating the fabrication of a support structure or mandrel which supports the uptapered optical fibers. Simultaneous alignment to all optical fibers is performed by first aligning the center fiber, and then rotating the mandrel to align the rotational orientation.

FIRST EMBODIMENT

Figure 3:
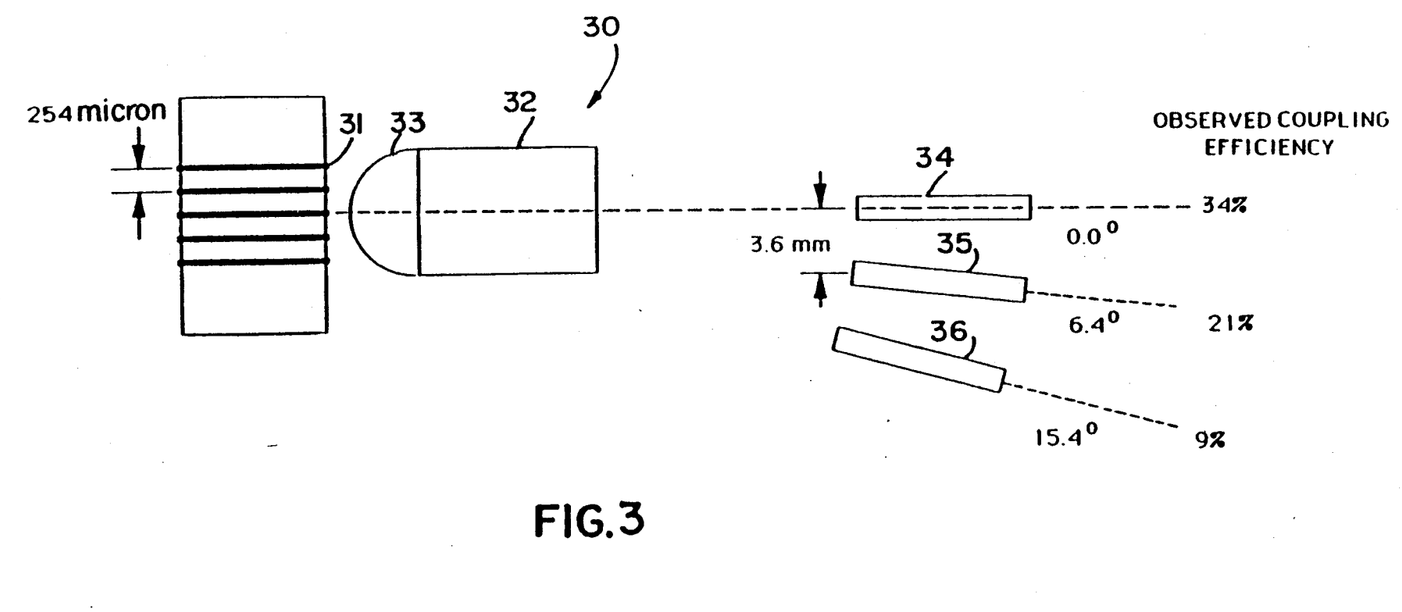
FIG. 3 is a diagrammatic view of a first embodiment of the method of the invention illustrating the use of a GRIN lens to couple an array of uptapered optical fibers to a semiconductor laser array.

The first embodiment of this invention is the method of using a GRIN lens to couple an array of uptapered optical fibers to a semiconductor laser array. This is shown in FIG. 3. The semiconductor laser array 30 is a single solid-state microelectronic chip with five separate laser elements 31 on it. The GRIN lens 32 used is a SELFOC pch 1.8-0.22 Micro Lens (SML). It has a physical diameter of 1.8 mm and an overall length of 3.3 mm. A curvature 33 is present on the end of the lens closest to the laser array in order to reduce distortions and increase the numerical aperture to 0.6. The lens 32 is centered on the laser array 30 and is located at a distance of about 0.37 mm from the laser array 30. A first uptapered optical fiber 34 is located about 15 mm away from the back of the lens 32. The spacing between lasers 31 in the array 30 is about 250 μm, while separation between uptapered optical fibers, 34, 35, 36 as a result of the magnification is about 3 mm. The separate light beams emerging from the lens arrive at the uptapered optical fibers 34, 35, 36 at different angles depending on the magnification and the displacement of the separate light sources from the centerline of the lens 32. For the five-element case shown, the outside beams arrive at about 15 degrees as compared to 0 degrees for the central beam.

When optically aligning this system, it is important to first rigidly fix the location of the GRIN lens 32 with respect to the laser array 30. This is done with a moderate melting point solder rather than a low melting point solder to reduce creep of the parts. The magnification is highly dependent on the array-to-lens distance. For example this lens produces magnifications of about 34, 9.7, and 4 for laser-to- lens distances of about 0.3, 0.4, and 0.6 mm respectively. The magnification is selected depending on the predetermined spacing desired between separate uptapered optical fibers 34, 35, 36, or what would best match the spot size of the magnified beam and the uptapered optical fiber cores. In this embodiment, a magnification of about 10 was used.

Alignment of the uptapered optical fibers 34, 35, 36 to the beam should be done to a precision of about 0.5 degrees of arc. Since the uptapered optical fibers have a fairly long, narrow and rigid geometry, this tolerance is easy to achieve. Also, as shown in FIG. 2, the uptapered optical fiber has a more relaxed transverse positional tolerance compared to conventional fiber. In our test of this embodiment, the optical fibers 34, 35, 36 were actively aligned using a micromanipulator while the laser array 30 was operating. The manipulator was capable of controlling the optical fiber position to a transverse tolerance of about 5 μm.

SECOND EMBODIMENT

Figure 4:
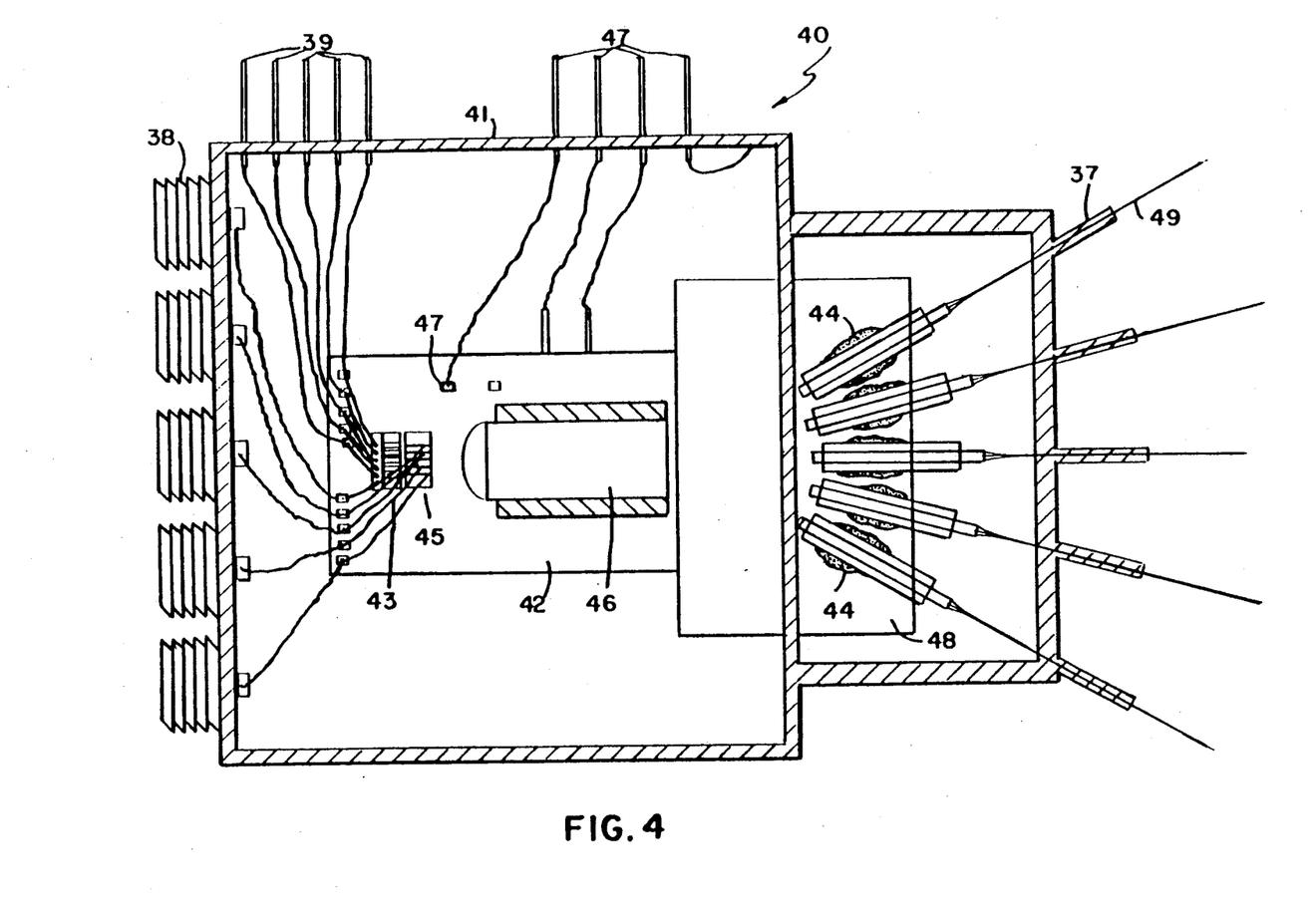
FIG. 4 is a top cut-away view of a first embodiment of an optoelectronic package embodying the method illustrated in FIG. 4.

The second embodiment of this invention is a package apparatus employing the method described in the first embodiment. This package, for use with a five-element laser array, is shown in FIG. 4. A metal housing 41, indicated by the dotted grey border in the diagram, encloses the necessary components that convert input electrical signals 38 to optical signals. A carrier 42 having a surface that is readily solderable, such as gold plated copper or brass, is used to support the components. The photodetector monitor array 43 and its associated shadow mask to prevent cross-talk between monitored array outputs 39 is optional. Its function is to keep the laser output power constant but it may not be necessary depending on the lasers or the application.

As in common practice, the semiconductor array 45 is first diebonded to an efficient thermally conductive heatsink such as diamond or boron nitride. The unit is then located on the carrier 42 by soldering to either a pedestal or a reference mark. For our package, this can be done to an accuracy of about 15 μm. The GRIN lens 46 is then located on the same carrier 42 with respect to the laser 45 using a mechanical stop on the carrier 42, and soldered in place with a moderate melting point solder such as 62/36/2 SnPbAg eutectic which melts at 179 degrees C.

The carrier assembly is completed by adding the usual thermistor 47 and internal wirebonds. Finally, the carrier is soldered to the top of a thermoelectric cooler (TEC) (not shown) which is located within the package housing. When the package is in operation, the TEC in conjunction with the thermistor is used to stabilize the operating temperature of the semiconductor 45 to maintain constant output power, a common practice. Wirebonding is performed to connect components on the carrier to the output and input electrical pins.

As shown in FIG. 4, part of the carrier 42 includes a section called the fiber stage 48. This is the part to which the uptapered optical fibers 49 attach. The fiber stage 48 is best as an integral part of the carrier 42 to reduce small movements of the optical fiber 49 relative to the lens 46.

The optical fiber alignment is done actively, as described earlier for single element semiconductors, except that the alignments are done sequentially and fastened in position with a room temperature curing epoxy to prevent disturbance of previously aligned optical fibers. The uptapered fiber optics relaxes the tight transverse tolerances sufficiently to allow for an epoxy fastening, as discussed earlier. Each alignment is done separately using the vacuum tip micromanipulator.

The package is completed by sealing a lid on it with epoxy and providing additional support for the optical fibers exiting the package trough the fiber ports. The package is then tested and ready for delivery.

THIRD EMBODIMENT

Figure 5:
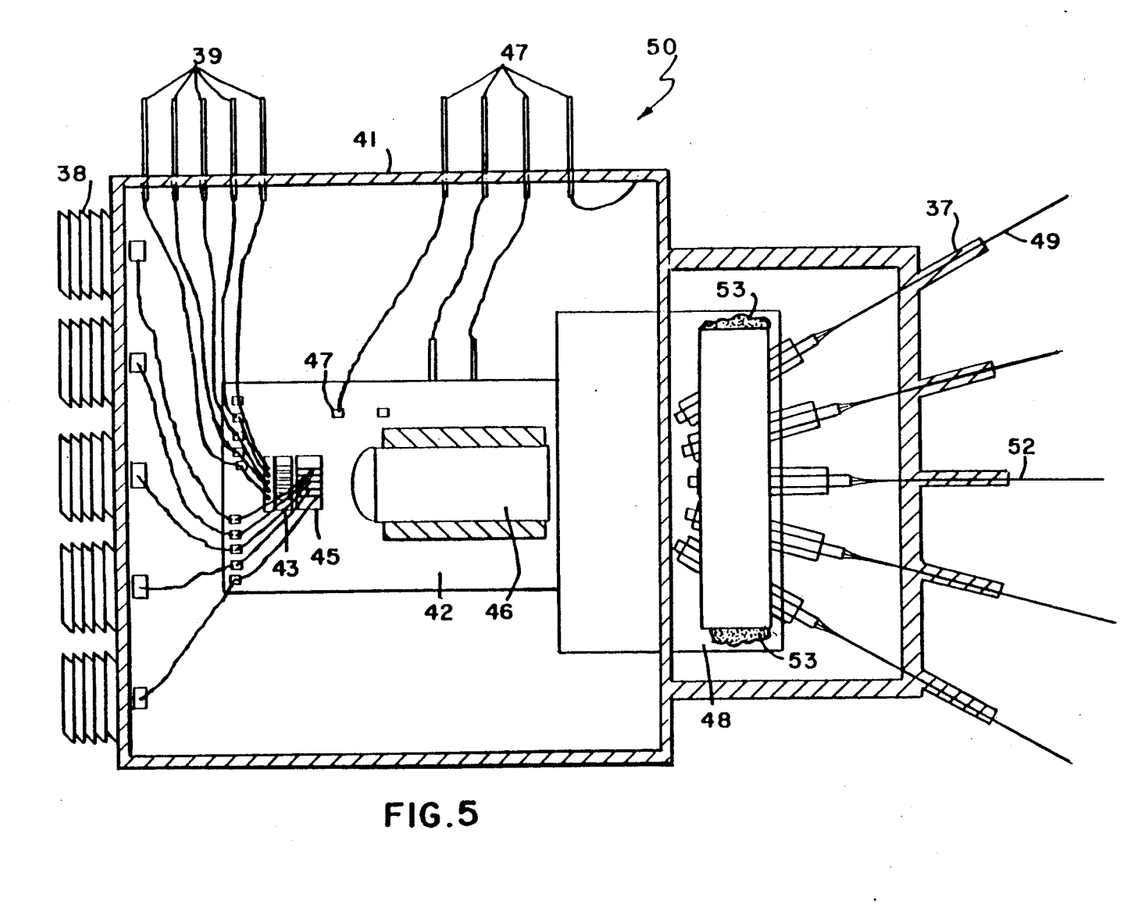
FIG. 5 is a top cut-away view of a second embodiment of an optoelectronic package, similar to that of FIG. 4, but further including a multi-fiber holder.

The third embodiment is the package apparatus 50 and method for doing a simultaneous alignment of the array fibers. This is shown in FIG. 5. The 50 package and its assembly is basically the same as described in the second embodiment except that all the optical fibers are previously mounted in a multi-fiber holder 51. The geometry of the holder 51 is predetermined based on the laser array-to-lens spacing. The multi-fiber holder 51 is then aligned to the center laser beam by actively aligning the center optical fiber 52 only. Most of the error associated with the alignment of the other fibers is taken up in this first alignment. The central optical fiber alignment automatically positions the alignment of the other optical fibers because of the photolithographic precision of the active laser elements on the chip as discussed before. The holder 51 is then epoxied 52 in position as it if were a single optical fiber and the package is completed as described earlier. This system sacrifices some precision in exactly locating each optical fiber in exchange for a process that requires less time to complete all alignments.

FOURTH EMBODIMENT

Figure 6A:
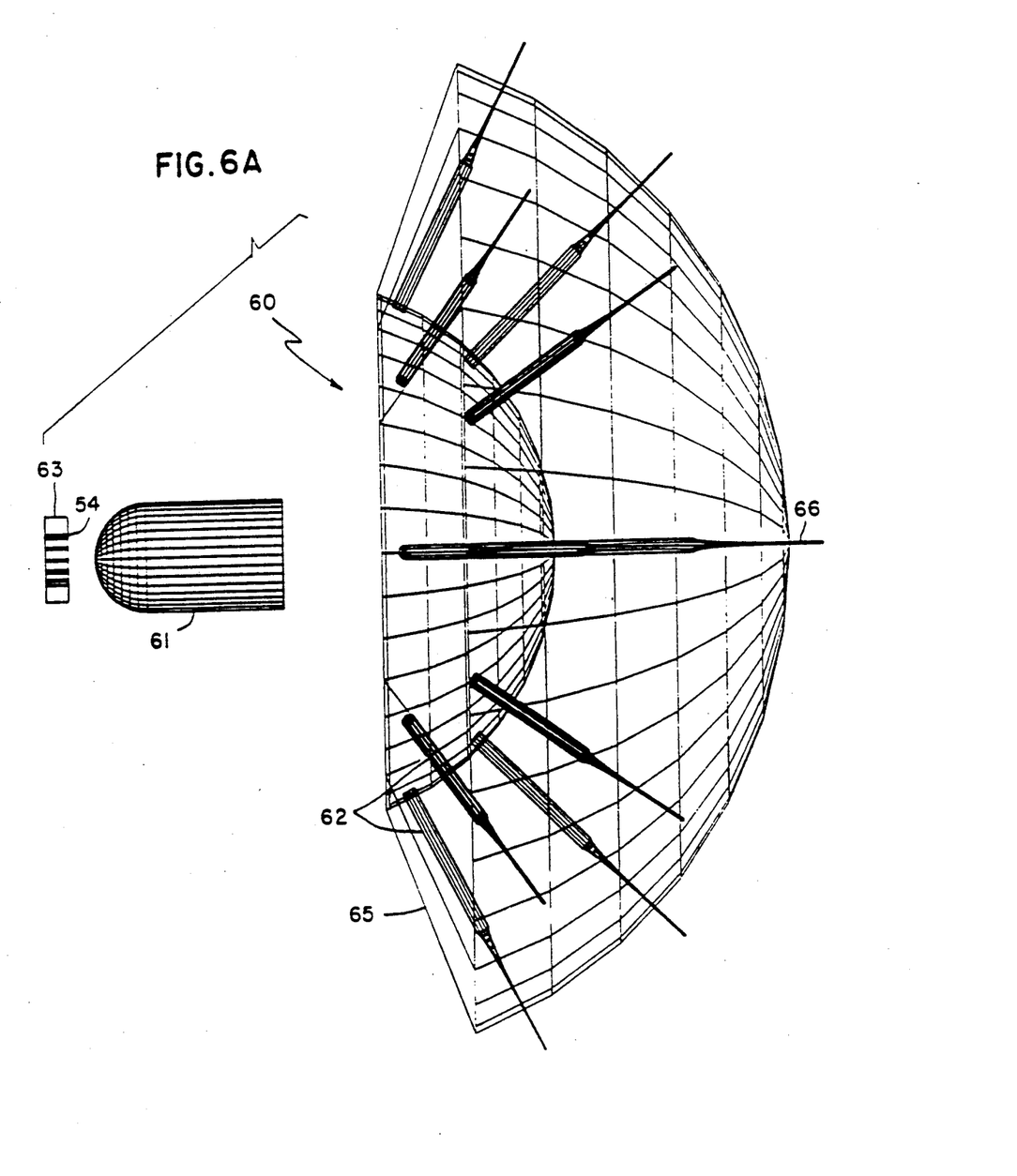
FIGS. 6a, 6b, and 6c are side, end and perspective views respectively of an embodiment of an optoelectronic package in which uptapered optical fibers are coupled through a lens to a seventeen-element, two-dimensional semiconductor surface array.
Figure 6B:
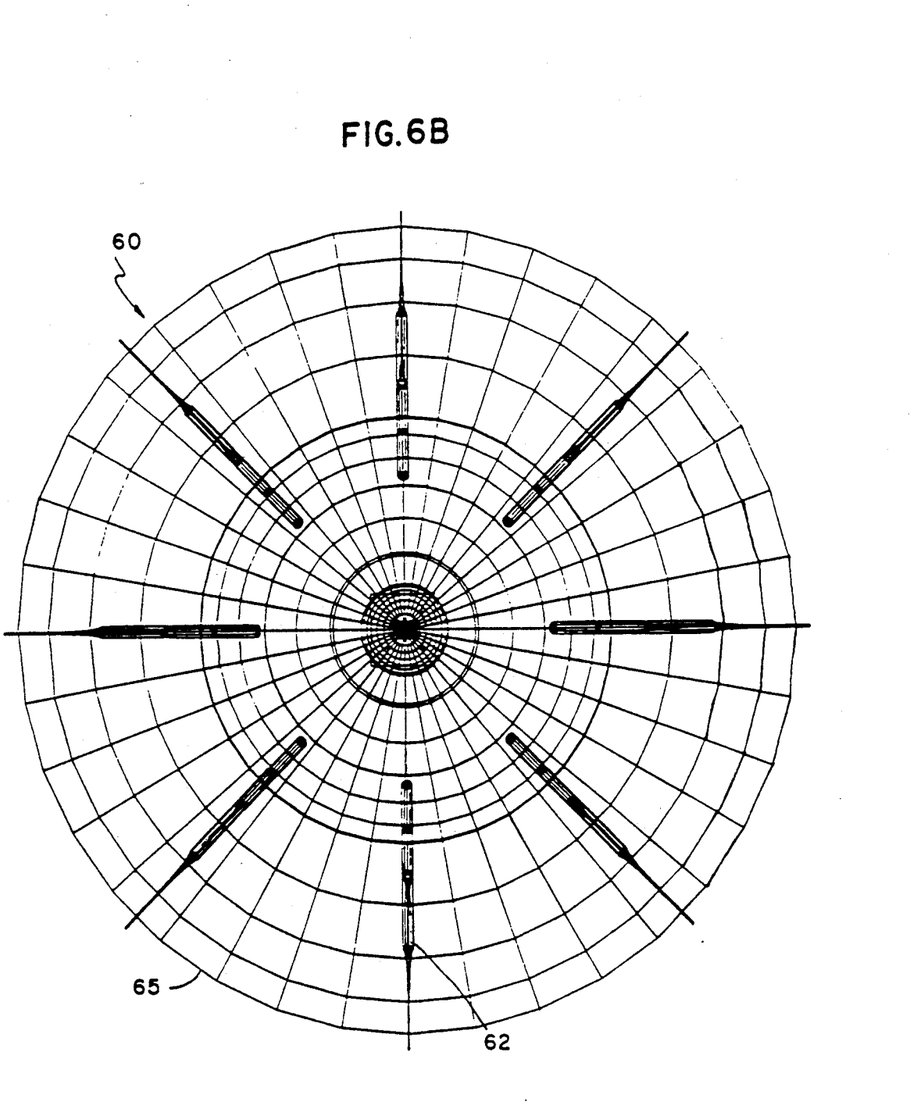
Figure 6C:
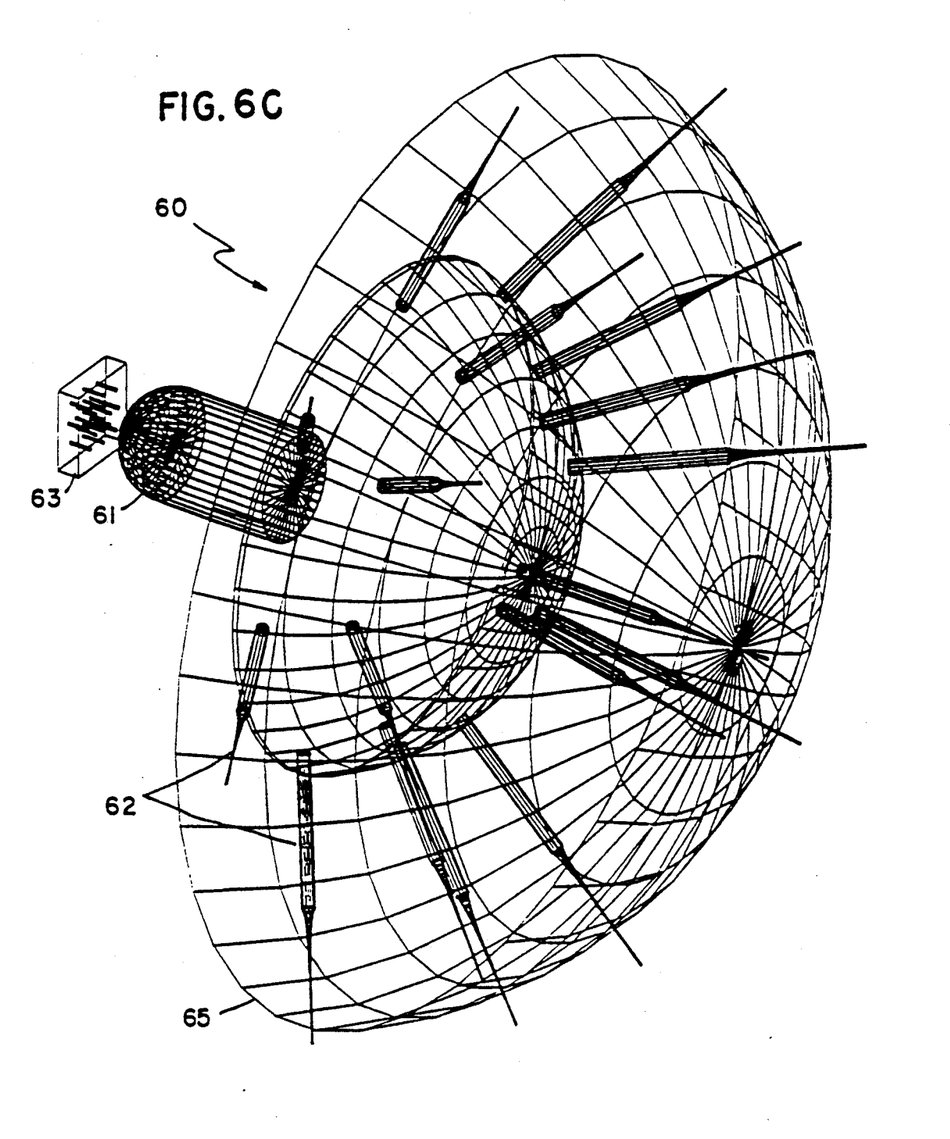

The fourth embodiment is the method of using the graded index lens 61 with uptapered optical fibers 62 to couple to elements 64 of a two-dimensional surface array 63. This is shown in FIGS. 6a, 6b and 6c. Since the numerical aperture of the lens 61 accepts light from a two-dimensional surface in the same way as it does from a line of active elements, it follows that the method will work to the same degree of precision and tolerance for other cases. As shown in the figure, light emitted from as many as seventeen elements 64 can be transmitted through the lens 61 to the optical fibers 62. In practice, it is recommended that the optical fibers 62 be held in a support mandrel 65 as shown schematically in the FIGS. 6a–6c. This allows for the use of the basic simultaneous alignment scheme as described above by first doing an active alignment to the center optical fiber 66 and then rotating the mandrel until the outside fibers come into alignment. The entire mandrel 65 can be then potted into position with epoxy.

VARIATIONS

The major variation possible for our invention is the use of lenses other than a (graded index) lens. It is reasonable that a convex, planer-convex, or other partially convex lens may be substituted to achieve a similar magnification effect. It is also possible to use cleaved optical fibers rather than uptapered optical fibers and still get a functional package but we prefer the uptapered optical fibers since they are used with more magnification. The system will work for local area networks (LAN) as well as computers, video and telecommunications. Finally, it should be remembered that our invention applies to any semiconductor array of active elements that needs coupling to a set of optical fibers and is not limited to laser arrays described in the embodiments.

This invention offers substantial advantages. First, it is not limited to one-dimensional arrays, such as standard edge emitters and detectors but can also be used for two-dimensional arrays, such as surface emitters and detectors. Secondly, the technique provides a predictable, reproducible location of the optical fibers for maximum coupling efficiency, so that the entire array can be simultaneously aligned. This takes maximum advantage of the extreme precision of the semiconductor array dimensions. Thirdly, this method offers the opportunity to introduce optical filtering of the separate beams in an array, due to the increased space between the lens and the optical fibers. Finally, packages for optoelectronic components incorporating this method are feasible.

We claim:
1. A method for the precise alignment of multiple uptapered single-mode optical fibers to a single pack- aged optoelectronic array device having at least two light-emitting sources, comprising the steps of:

selecting a graded index lens having a numerical aperture sufficiently large to optically access the light-emitting sources of said optoelectronic array for optically coupling each uptapered optical fiber to a respective light emitting source of said array through said lens;

securing said graded index lens on a substrate of said package a fixed distance from said optoelectronic array such that the light beams from said light-emitting sources are magnified and the spacing between said beams is expanded;

sequentially aligning said optical fibers with said light-emitting sources by optically coupling the thick end of each of said uptapered single-mode optical fiber to a respective light beam emanating from said optoelectronic array after said beam has been magnified by said lens; and securing said optical fibers to said package after alignment.

2. The method of claim 1, wherein a ratio between the core sizes at the uptapered and downtapered ends of each optical fiber ranges from unity to ten.

3. The method of claim 1 wherein said graded index lens has a magnification factor of ten.

4. The method of claim 1 wherein said graded index lens magnifies a light beam by a factor of ten and expands the separation of light beams emanating from said light-emitting sources by a factor of ten.

5. The method of claim 1 wherein said graded index lens has a numerical aperture of 0.6.

6. The method of claim 1 wherein the side of said lens facing said light-emitting sources has a curved face.

7. The method of claim 1 wherein the number of light-emitting sources on said optoelectronic array device is less than or equal to five.

8. The method of claim 1 wherein the step of aligning said optical fibers with said light-emitting sources further comprises the steps of:

determining the precise location of said light-emitting sources on said optoelectronic array device;

positioning centrally and rigidly securing said graded index lens having a predetermined magnification factor such that a central light beam from said optoelectronic array passes through said the center of said lens;

determining the precise location of said magnified light beams from said activated light-emitting sources as magnified by said rigidly positioned graded index lens having a known magnification factor; and securing said uptapered optical fibers to a fixture such that each of said optical fibers is positioned to be coupled with a light beam of known location and size emanating from said activated optoelectronic array.

9. The method of claim 8 wherein said optoelectronic array device is a two-dimensional.

10. The method of claim 9 wherein said two-dimensional array is a surface emitting array.

11. The method of claim 8 wherein the number of light sources on said array is less than or equal to seventeen.

12. The method of claim 8 wherein said fixture is a mandrel.

13. The method of claim 8 wherein said light-emitting sources are arranged in a circle having the numerical aperture of said graded index lens.

14. The method of claim 8 further comprising the step of rotating said fixture until all of said optical fibers are optically coupled to all of said light beams.

15. A method for simultaneous precise alignment of multiple uptapered single-mode optical fibers to a single packaged optoelectronic array device having an array of at least two light-emitting sources, comprising the steps of:

selecting a graded index lens having a numerical aperture sufficiently large to optically access the light-emitting sources of said optoelectronic array device;

securing said graded index lens on a substrate of said package a fixed distance from said optoelectronic array device such that the light beams from said light-emitting sources are magnified and the spacing between said beams is expanded;

positioning and securing a plurality of uptapered optical fibers in a fixture such that the spacing of the thick ends of said uptapered optical fibers matches the spacing of said light beams emanating from said array after magnification and separation by said lens;

simultaneously aligning all of said optical fibers in said fixture with said light-emitting sources by optically coupling the thick end of one uptapered single-mode optical fiber centrally positioned in said fixture to that light beam emanating from a central light-emitting source of said optoelectronic array after said beam has been magnified by said lens, thereby aligning all of said optical fibers with said light sources; and securing said fixture to said package after alignment.

16. The method of claim 15 wherein a ratio between the core sizes at the uptapered and downtapered ends of each optical fiber ranges from unity to ten.

17. The method of claim 15 wherein said graded index lens has a magnification factor of ten.

18. The method of claim 15 wherein said graded index lens magnifies a light beam by a factor of ten and expands the separation of light beams emanating from said light-emitting sources by a factor of ten.

19. The method of claim 15 wherein said graded index lens has a numerical aperture of 0.6.

20. The method of claim 15 wherein the side of said lens facing said light-emitting sources has a curved face.

21. The method of claim 15 wherein the number of light-emitting sources on said optoelectronic array device is less that or equal to five.

22. The method of claim 15 wherein the step of securing said graded index lens further comprises the steps of:

determining the precise location of said light-emitting sources on said optoelectronic array device; and positioning centrally and rigidly securing said graded index lens having a predetermined magnification factor such that a central light beam from said optoelectronic array device passes through said the center of said lens.

23. The method of claim 15 wherein the step of simultaneously aligning all of said optical fibers further comprises the steps of:

determining the precise location of said magnified light beams from said light-emitting sources as magnified by said rigidly positioned graded index lens having a known magnification factor; and securing said uptapered optical fibers to a fixture such that each of said optical fibers is positioned to be coupled with a light beam of known location and size emanating from said array.

24. The method of claim 23 wherein said array of light-emitting sources is a two-dimensional array.

25. The method of claim 24 wherein said two-dimensional array is a surface emitting array.

26. The method of claim 24 wherein that number of light-emitting sources on said array is less than or equal to seventeen.

27. The method of claim 24 wherein said fixture is a mandrel.

28. The method of claim 24 wherein said light-emitting sources are arranged in a circle having the numerical aperture of said graded index lens.

29. The method of claim 24 further comprising the step of rotating said fixture until a second uptapered single-mode optical fiber is aligned simultaneously, thereby optically coupling all of said optical fibers to all of said light beams.

30. A method for the precise alignment of an array of uptapered multiple single-mode optical fibers to a two-dimensional semiconductor laser array in a packaged optoelectronic component, said array having at least two light-emitting sources, comprising the steps of:

predetermining the spacing required between said optical fibers for optimal coupling to said light-emitting sources;

positioning and centering a graded index lens at a distance from said two-dimensional array, said lens having a numerical aperture such that said lens can access optically all light-emitting sources of said array and magnify a light beam emanating from said light-emitting sources and such that a central light beam from said array passes through the center of said lens;

securing said lens to a substrate of said component with a moderate melting point solder at a calculated fixed array-to-lens distance which is a function of the magnification desired;

an array of uptapered optical fibers positioned at a distance from said lens, the central uptapered fiber of said array being positioned for optical coupling to a light beam emanating from the central light-emitting source of said laser array;

determining the precise location of said magnified light beams from said light-emitting sources as magnified by said rigidly positioned graded index lens having a known magnification factor; and securing said uptapered optical fibers to a fixture such that each of said uptapered optical fibers is positioned to be optically coupled with a light beam of known location and size emanating from said optoelectronic component;

actively aligning the central uptapered optical fiber by coupling the thick end of said fiber to the central beam emanating through said lens;

rotating said fixture until a second uptapered single-mode optical fiber is aligned simultaneously, thereby optically coupling all of said optical fibers to all of said light beams; and securing said fixture to said package after alignment.

31. The method of claim 30 wherein a ratio between the core sizes at the uptapered and downtapered ends of each optical fiber ranges from unity to ten.

32. The method of claim 30 wherein said graded index lens has a magnification factor of ten.

33. The method of claim 30 wherein said graded index lens magnifies a light beam by a factor of ten and expands the separation of light beams emanating from said light-emitting sources by a factor of ten.

34. The method of claim 30 wherein said graded index lens has a numerical aperture of 0.6.

35. The method of claim 30 wherein the side of said lens facing said light-emitting sources has a curved face.

36. The method of claim 30 wherein said light-emitting sources comprise a two-dimensional surface emitting array.

37. The method of claim 30 wherein the number of light-emitting sources on said two-dimensional array is less than or equal to seventeen.

38. The method of claim 30 wherein said fixture is a mandrel.

39. The method of claim 30 wherein said light-emitting sources are arranged in a circle having the numerical aperture of said graded index lens.

* * * * *